United States Patent [19]

Beer

[11] Patent Number: 4,874,055
[45] Date of Patent: Oct. 17, 1989

[54] CHARIOT TYPE GOLF CART

[76] Inventor: Robin F. C. Beer, Seafield Ballymoney, Gorey, County Wexford, Ireland

[21] Appl. No.: 134,039

[22] Filed: Dec. 16, 1987

[51] Int. Cl.⁴ .............................................. B62D 51/00
[52] U.S. Cl. .................... 180/19.2; 180/65.1; 180/215; 280/DIG. 5; D34/15
[58] Field of Search .................. 280/DIG. 5, DIG. 6, 280/656, 87.04 B; 180/65.1, 19.1, 19.2, 19.3, 215, 181; D8/DIG. 3; D34/15, 27

[56] References Cited

U.S. PATENT DOCUMENTS

| | | | |
|---|---|---|---|
| D. 183,852 | 11/1958 | Marcus | D14/3 |
| D. 186,428 | 10/1959 | Gunning | 280/DIG. 6 |
| 2,771,145 | 11/1956 | Peters | 180/26 |
| 2,918,134 | 12/1959 | Jensen | 280/DIG. 5 |
| 2,957,700 | 10/1960 | Beaurline | 280/DIG. 5 |
| 3,041,085 | 6/1962 | White | 280/DIG. 5 |
| 3,369,629 | 2/1968 | Weiss | 180/208 |
| 3,635,301 | 1/1972 | Tuson | 280/DIG. 5 |
| 3,648,795 | 3/1972 | Moultron | 280/DIG. 5 |
| 4,063,612 | 12/1977 | Weiss | 180/19.2 |
| 4,354,569 | 10/1982 | Eichholz | 180/211 |
| 4,522,281 | 6/1985 | Snider | 180/208 |
| 4,538,695 | 9/1985 | Bradt | 180/216 |
| 4,573,549 | 3/1986 | Pankow | 180/216 |
| 4,620,711 | 11/1986 | Dick | 280/30 |

FOREIGN PATENT DOCUMENTS 2127364  4/1984  United Kingdom ......... 280/DIG. 5

*Primary Examiner*—David M. Mitchell
*Assistant Examiner*—Eric Culbreth
*Attorney, Agent, or Firm*—Thomas & Kennedy

[57] ABSTRACT

A motorized golf cart has a frame that supports a platform upon which a golfer may stand while straddling a golf bag supported upon the platform along an incline. A U-shaped articulated steering bar is provided for adjustable positioning of a handle portion of the bar in forward and intermediate positions for control by a walking and riding golfer, respectively, and in a rear position for supporting the cart upendedly for storage.

4 Claims, 3 Drawing Sheets

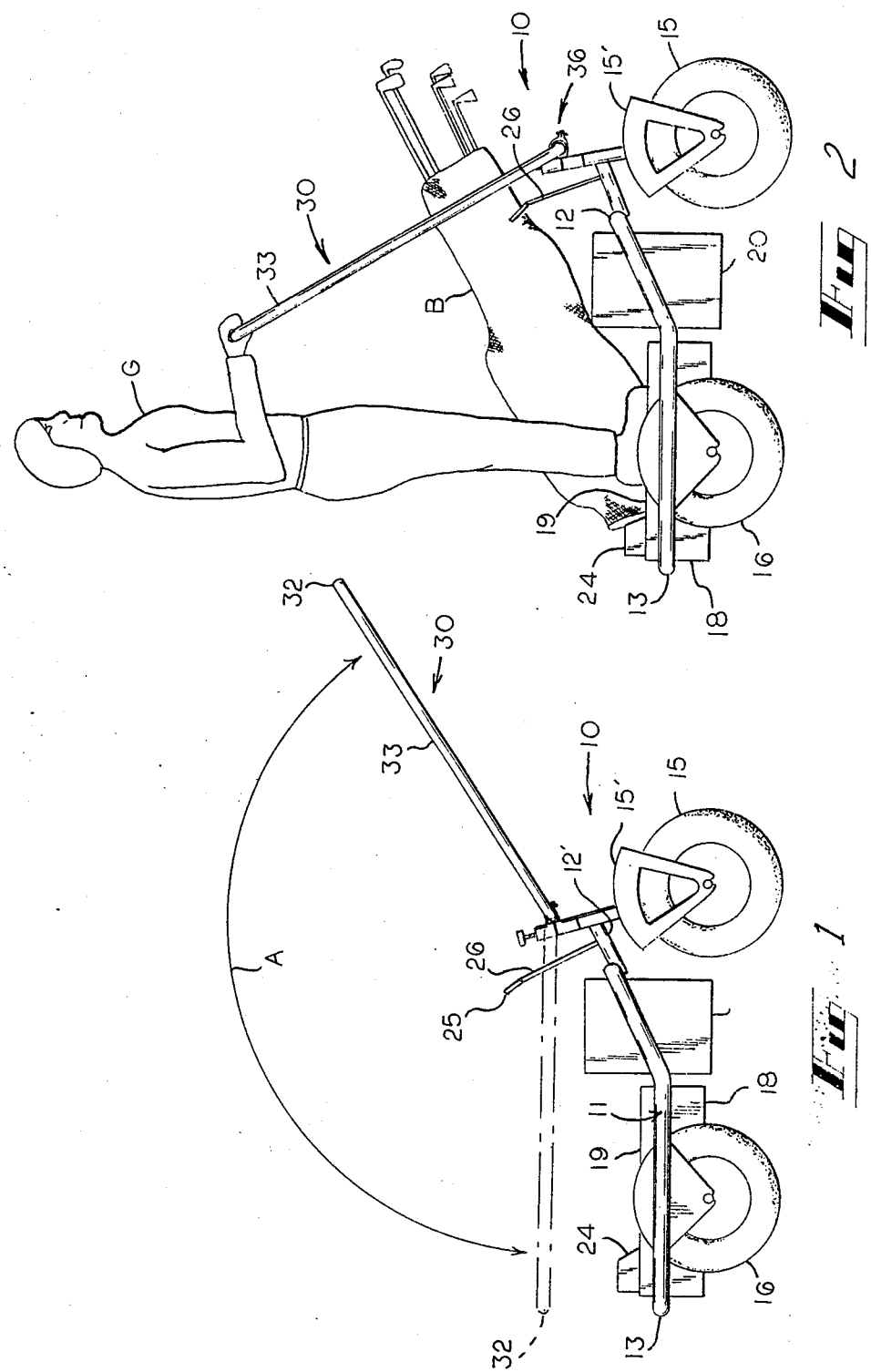

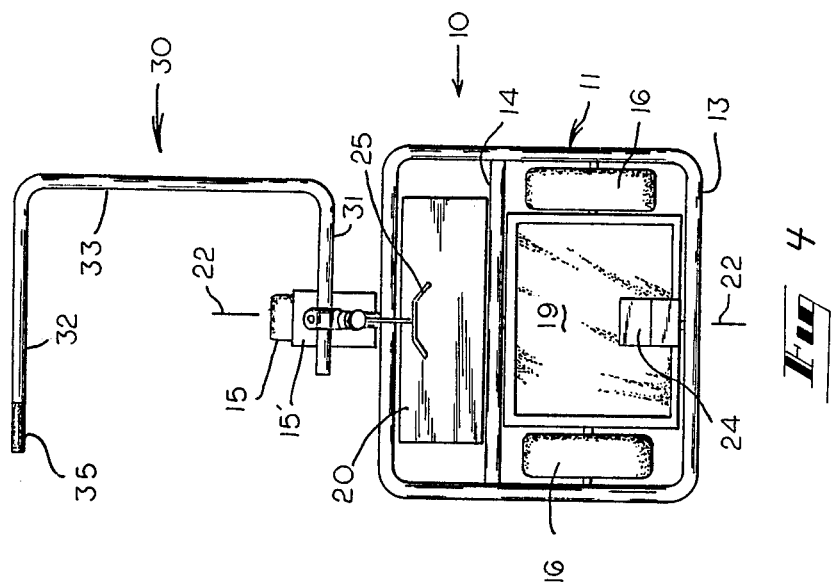
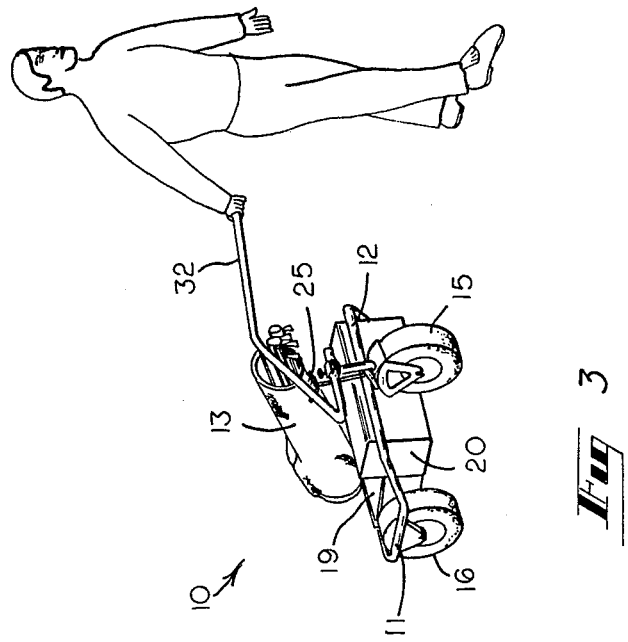

4,874,055

CHARIOT TYPE GOLF CART

TECHNICAL FIELD

This invention relates generally to golf carts, and particularly to golf carts of the type that are designed to be stood upon and driven in a manner like that of driving a motorized chariot.

BACKGROUND OF THE INVENTION

Heretofore, attempts have been made to develop small golf carts to provide individual golfers with a motorized means for conveying the golfer and his or her golf bag about a golf course. Exemplary of such attempts are those golf carts shown in U.S. Pat. Nos. 3,369,629, 4,522,281, 4,538,695 and 4,573,549. These designs have focused on providing a small, lightweight golf cart that may be collapsed for storage and transportation. Some have also been designed for use by a golfer walking beside the cart as well as riding upon it.

Though the concepts and basic design goals just described have been good, their implementations have not. As a result chariot type golf carts have failed to achieve popularity. Their lack of commercial success has been principally due to the difficulty of devising a golf cart with both the desired degree of versatility and simplicity of design. As a result, some desirable features have almost invariably had to be sacrificed.

For example, the golf car illustrated in U.S. Pat. No. 3,369,629 does have the attributes of having an articulated handlebar that may be moved between riding, walking and storage positions. It however is essentially a conventional, heavy, seat bearing cart with only side access and which requires the golfer to sit closely aside one or between two golf bags. Also when only one bag is carried, as would often occur iwth a one-person cart, the center of gravity of the cart is shifted to one side of center line thereby adversely affecting stability. The cart of U.S. Pat. No. 4,522,281 on the other hand is of simpler and of lighter construction in that it does not have a seat and which does provide a detachable club mount that is on center line. It however cannot easily be mounted from the rear nor can it be easily operated while walking.

The cart of U.S. Pat. No. 4,538,695 does have rear mounting, is lightweight and is designed to be operated while walking. These features however are achieved at the sacrifice of center line bag mounting, structural and aesthetic complexity, and an inability to be configured compactly for storage. The 4,573,549 cart has similar design tradeoffs in that it is without center line bag mounting and walk-beside operative capabilities.

It thus is seen that a need remains for a chariot type golf cart of simple, lightweight and high stability configuration that may easily be configured for storage, riding or walking. It is to the provision of such therefore that the present invention is directed.

SUMMARY OF THE INVENTION

In one form of the invention a golf cart comprises a frame and a platform mounted to the frame upon which a golfer may stand. A pair of rear wheels is mounted to the frame adjacent the platform while a front wheel is mounted to the frame forwardly of the platform. Motor means are provided for driving the wheels. Means are also included for supporting a golf bag in a designated space upon the frame. A steering mechanism is provided for steering the front wheel which includes a bar that is adjustably mounted to locate a handle portion above the frame for gripping by a golfer standing upon the platform, in a position forwardly of the frame for gripping by a golfer walking beside the cart, and in a position adjacent a rear end of the frame for supporting the cart in an upended position for storage.

In another form of the invention a golf cart comprises a frame having front and rear ends and a platform mounted adjacent the frame rear end upon which a golfer may stand. A pair of rear wheels is mounted to the frame straddling the platform. A front wheel is steerably mounted adjacent the frame front end along a fore and aft cart center line that extends centrally through the platform. Motor means are provided for driving the rear wheels. Means are also provided for supporting a golf bag along the cart center line in an inclined position. The cart further includes articulated means for steering the front wheel that includes a steering rod rotatably housed within a tubular steering column and a serpentine bar adjustably coupled with the steering rod. The serpentine bar has upper and lower arms joined together at adjacent arm ends by a leg that is located to one side of the cart center line.

In yet another form of the invention a golf cart is provided for use by a single golfer to transport a golf bag with the golfer either standing upon the cart or walking beside it. The golf cart has a chassis that has a steerable front wheel and which carries a platform upon which a golfer and a golf bag may be supported. An articulated bar is adjustably coupled with the steerable front wheel for movement of a bar handle portion thereof between a position above the platform for gripping and steering control by a golfer standing upon the platform, a position forwardly of the front wheel for gripping and steering control by a golfer walking beside the cart, and a position adjacent the rear end of the platform for cart storage in an upended orientation.

BRIEF DESCRIPTION OF THE DRAWING

FIG. 1 is a side elevational view of a golf cart embodying principles of the present invention with an articulated steering bar located in a forward position for control by a golfer walking beside the cart.

FIG. 2 is a side elevational view of the cart illustrated in FIG. 1 shown with a golf bag supported upon the cart and with a golfer standing upon the cart gripping the articulated steering bar in its riding position.

FIG. 3 is a perspective view of a golfer walking beside the golf cart illustrated in FIGS. 1 and 2 while controlling the steering bar with it positioned as shown in FIG. 1.

FIG. 4 is a plan view of the golf cart illustrated in FIG. 1.

DETAILED DESCRIPTION

Figure 6:
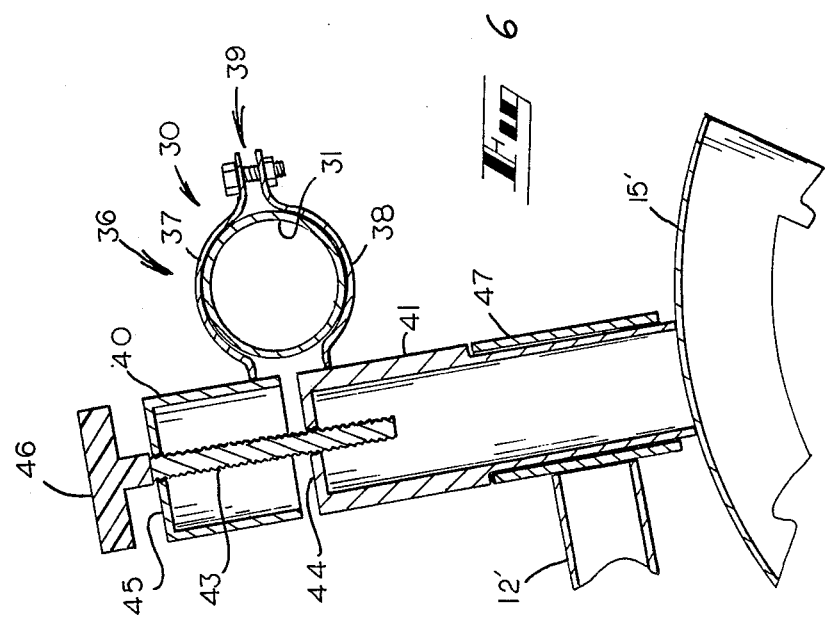
FIG. 6 is a cross-sectional view of a portion of the steering mechanism of the golf cart.

With reference next to the drawing, there is shown a golf cart 10 having a tubular frame 11 which has a front end 12 and a rear end 13 which is oriented parallel with the front end. The frame also has an intermediate bar member 14 which is also parallel with the front and rear ends.

In addition to the frame 11, the golf cart chassis includes a steerable front wheel 15 and a pair of rear wheels 16. The rear wheels 16 are driven by an unshown electric motor located within a modular motor and power transmission housing 18 that is mounted beneath a platform or stand 19. The motor here is an electric motor which is powered by batteries housed within a battery pack 20 which is mounted to the frame 11 between the frame front end 12 and intermediate bar 14. The electric motor and associated power train are of conventional construction.

The golf cart also has means for supporting a golf bag B in a designated space at an incline along a fore and aft center line 22 of the golf cart. The bag support means includes a foot stand 24 mounted along the center line 22 atop the rear end of platform 19. The bag support also includes a fork or cradle 25 which is mounted to the end of a stanchion 26 that projects upwardly and rearwardly from a forwardly protruding frame member 12'. With this construction it is seen that a bag B may be readily mounted upon the platform with its bottom in flush abutment with the foot stand 24 and its forward end nestled upon the fork 25. In this position ample room remains available upon the stand 19 to each side of the bag upon which a golfer G may stand, as shown in FIG. 2. Though the various components thus far described are open to view, it should be understood that they may be covered by a small body member, if desired.

With continued reference to the drawings, the golf cart is further seen to have an articulated steering or control bar indicated generally at 30 which is hollow and of a serpentine, generally U-shaped configuration as viewed from one side of a cart. The steering bar has a mounting arm portion 31 connected to a control arm portion 32 by a leg portion 33. The control arm is provided with a rotatable hand grip 35 that provides a conventional hand throttle from which a control cable extends through the steering bar 30 to the electric motor throttle.

The steering bar mounting arm 31 is seen best from FIG. 6 to extend through a clamp 36 that has an arcuate upper jaw 37 and lower jaw 38 which are adjustably held together by a nut and bolt 39. The upper jaw 36 is rigidly mounted to an upper steering rod member 40 while the lower jaw 38 is rigidly mounted to a lower steering rod member 41. These two steering rod members are in turn held together by another bolt 43 that is threaded into an upper end 44 of the lower steering rod member 41. The bolt 43 extends through an opening in the top end 45 of the upper steering rod 40 to a handle or knob 46. The lower control rod 41 extends through a stationary steering column 47 that is mounted to the end of the forwardly projecting frame front member 12' and to the wheel well 15' of the front wheel 15. With this construction it is seen that pivotal movement of the steering bar causes the steering rods and front wheel assembly to turn and thereby to effect cart steering.

The steering control bar 30 is rendered articulatable by its shape and the mounting assembly shown in FIG. 6. The position of the control arm portion 31 may be rotatably adjusted with respect to the clamp 30 so that its position can be changed as shown by the arrow A in FIG. 1. This is done in an expedient manner by merely rotating handle 46 which loosens the jaws 37 and 38 about the steering bar to enable it then to be adjusted to a new rotary position within the clamp. Once this is done the handle 46 is manually rotated in the opposite direction to bring the jaws 37 and 38 back into a firm gripping engagement with the control bar. In this manner the bar 30 may be positioned forwardly of the frame as in FIG. 1, above the frame as in FIG. 2, or adjacent the frame rear end as in FIG. 5.

In use a golf bag B is cradled upon the fork 26 and foot stand 24. A golfer G may then mount the cart from either side or from the rear and position his feet upon the platform 19 straddling the bag. One hand may then grip an intermediate portion of the steering bar control portion 32 and the other hand hold the control grip 35. Acceleration and deacceleration of the cart may be then be achieved by manually twisting the hand grip 35. Steering is affected by merely pivoting or rocking the bar.

Figure 5:
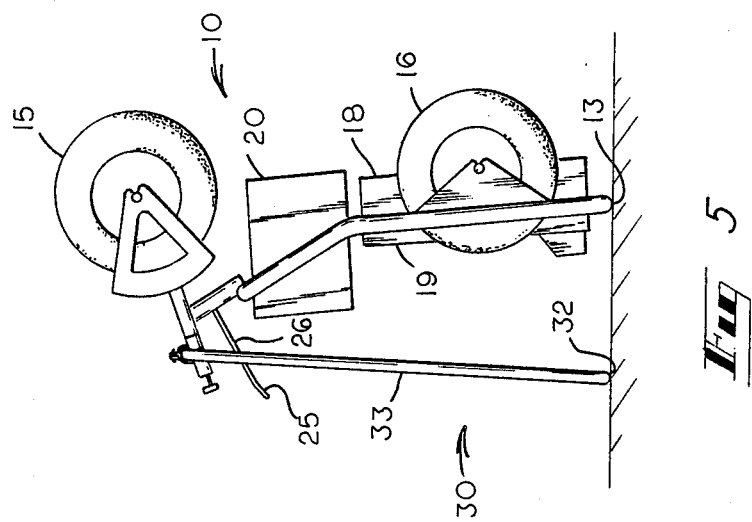
FIG. 5 is a side elevational view of the golf cart illustrated in FIG. 1 shown upended with its steering bar positioned for storage.

Should it become desirable to walk beside the cart rather than to be transported upon it, the golfer may readily reposition the control bar from its position shown in FIG. 2 to its position shown in FIGS. 1, 3 and 4. He may then easily walk beside and forwardly of the cart while maintaining good control of it with his right hand gripping the hand grip 35 as shown in FIG. 3. When it becomes desirable to store the golf cart the control bar is then reoriented to its position illustrated in solid lines in FIG. 5 and in broken lines in FIG. 1. This is all done without interference with the golf bag B by the unique configuration of the steering or control bar 30. In this position the control portion 32 is coextensive with the rear portion 13 of the cart frame in a cart storage support plane. This enables the cart to be stood upended, resting upon a ground support with the frame portion 13 and control bar portion 32 in a good position for stable support of the cart as shown in FIG. 5 with the cart supported substantially perpendicular to its normal operative support plane defined by its wheels.

Preferably, the golf cart is also provided with braking means, safety cutoff switches, and battery recharge means all of a conventional nature. For left handed golfers the steering bar is mounted so that the leg 33 extends along the left side of the center line rather than the right. The steering bar may also be of a rectangular shape with two control grips to service both left and right handed golfers, still without bag interference in any of its positions.

It thus is seen that a golf cart is now provided which overcomes problems and limitations long associated with those of the prior art. It should, of course, be understood that the just described embodiment merely illustrates principles of the invention in one preferred form. Many modifications, additions and deletions other than those expressly stated may be made thereto without departure from the spirit and scope of the invention as set forth in the following claims.

I claim:

1. A golf cart comprising:
   a frame having a front end and a rear end;
   a platform mounted to said frame upon which a golfer may stand;
   a pair of rear wheels mounted to said frame substantially straddling said platform, said wheels having a common axis oriented substantially perpendicular to a fore and aft cart center line which extends centrally through said platform;
   a front wheel steerably mounted adjacent said frame front end along said cart center line said front and rear wheels being tangent to a cart operative support plane;

drive means for driving at least one of said rear wheels;

bag support means for supporting a golf bag in a designated space upon said platform; and means for steering and supporting the cart for storage in an upended position and which includes a bar steerably coupled with said front wheel and having an elongated handle portion, oriented substantially parallel to said common axis of said rear wheels, said bar being adjustably mounted to locate said handle portion in a first position above said frame for gripping by a golfer standing upon said platform, a second position forwardly of said frame for gripping by a golfer walking beside said cart and a third position adjacent said frame rear end said handle portion and said frame rear end being coextensive in a cart storage plane substantially perpendicular to said cart operative plane in said third position.

2. The golf cart of claim 1 wherein said handle portion in said third position is spaced from said frame rear end a distance to locate the cart center of gravity horizontally between said handle portion and said frame rear end with said cart in said upended storage orientation.

3. The golf cart of claim 2 wherein said bar handle portion is substantially vertically aligned with said frame rear end when said cart is in its upright operating orientation with said cart front and rear wheels supported on a substantially horizontal plane.

4. The golf cart of claim 1 wherein said bar is substantially U-shaped to have a pair of parallel arms and wherein one of said arms is coupled with said front wheel and the other one of said arms includes siad elongated handle portion, said bar extending about three sides of a space to receive a golf bag supported on said platform when said handle portion is in its third position.

* * * * *